United States Patent [19]
Crook et al.

[11] Patent Number: 5,404,474
[45] Date of Patent: Apr. 4, 1995

[54] APPARATUS AND METHOD FOR ADDRESSING A VARIABLE SIZED BLOCK OF MEMORY

[75] Inventors: Neal A. Crook, Reading; Stewart F. Bryant, Redhill, all of England; Michael J. Seaman, San Jose, Calif.; John M. Lenthall, Galway, Ireland

[73] Assignee: Digital Equipment Corporation, Maynard, Mass.

[21] Appl. No.: 819,393

[22] Filed: Jan. 10, 1992

[51] Int. Cl.6 .............................. G06F 12/06
[52] U.S. Cl. ...................... 395/400; 364/254; 364/254.3; 364/254.9; 364/255.1; 364/259; 364/259.1; 364/DIG. 1
[58] Field of Search ................. 395/400, 425

[56] References Cited

U.S. PATENT DOCUMENTS

| | | | |
|---|---|---|---|
| 5,093,783 | 3/1992 | Kitada | 395/400 |
| 5,109,334 | 4/1992 | Kamuro | 395/400 |
| 5,150,471 | 9/1992 | Tipon | 395/400 |
| 5,210,839 | 5/1993 | Powell et al. | 395/400 |

Primary Examiner—Jack B. Harvey
Assistant Examiner—Michael A. Whitfield
Attorney, Agent, or Firm—Kenyon & Kenyon

[57] ABSTRACT

A method and apparatus for aliasing an address for a location in a memory system. The aliasing permits an address generating unit to access a memory block of variable size based upon an address space of fixed size so that the size of the memory block can be changed without changing the address generating software of the address generating unit. The invention provides an address aliasing device arranged to receive an address from the address generating unit. The address aliasing device includes a register that stores memory block size information. The memory block size information is read by the address aliasing device and decoded to provide bit information representative of the size of the memory block. The address aliasing device logically combines the bit information with appropriate corresponding bits of the input address to provide an alias address that is consistent with the size of the memory block.

17 Claims, 3 Drawing Sheets

APPARATUS AND METHOD FOR ADDRESSING A VARIABLE SIZED BLOCK OF MEMORY

FIELD OF THE INVENTION

The present invention is directed to a computer memory system and, more particularly, to a scheme for aliasing addresses to identify locations within a memory block of variable size that is stored within an address space of constant size so that the actual size of the memory block is hidden from and made irrelevant to a device writing data to the memory block.

BACKGROUND OF THE INVENTION

In modern computer design, resources provided in a computer system are shared among several processing devices for efficient performance. Each resource can comprise, e.g., a processor configured to perform preselected operations or processing services for the other processing devices of the system. Whenever a resource is provided in a computer system, fairness becomes a design issue. Fairness concerns the fair allocation of the services provided by the resource among the processing devices that utilize the resource. It is typically a design criteria in the implementation of a resource that no one processing device so dominate the use of the resource that other processing devices of the computer system are unable to receive adequate service from the resource.

In one scheme for interlocking processing devices to a shared resource, a plurality of storage devices, such as, e.g., ring buffers, is provided. Each processing device of the system that utilizes a particular resource is allocated one or more of the ring buffers. In this manner, each processing device can write into addressable locations within an allocated ring buffer, requests for use of the resource and other information that may be required by the resource for the performance of its service. The resource operates to poll the addressable locations of the ring buffers, as, e.g., in a round robin scheme, to read and process the requests and other information stored in the ring buffers.

Typically, an "ownership" scheme is implemented in the ring buffer system so that a processing device will write a request into an allocated ring buffer location only when the processing device "owns" that location. The processing device relinquishes ownership once it writes a request into a particular location. The resource returns the ownership to the processing device after it has read the information in the particular ring buffer location and proceeds to process the request. A processing device will not be able to write additional requests once it has relinquished ownership of all of its allocated locations until the resource returns ownership for at least one location.

The number of buffered requests represents the workload imposed by the processing devices on the resource. Thus, the fair allocation of the resource can be controlled by fixing the size and number of ring buffers allocated to each processing device that utilizes the shared resource on the basis of the expected use of the resource by each processing device. A processing device will be allocated a number of locations that will not result in an inordinate number of outstanding requests at any one time. Once the size of a ring buffer is fixed, the corresponding processing device must be made cognizant of that size and execute address software that generates addresses to properly identify the locations within the physical address space occupied by the allocated ring buffer.

If a processing device were coupled to several resources and the allocated ring buffers for the various resources were of different sizes, each ring buffer size must be communicated to the respective processing device and the processing device would have to execute different address software, each appropriate for the generation of addresses for the address space of one of the ring buffer sizes.

For example, a processing device would generate one of 256 possible addresses to verify ownership and thereafter write a request to a particular location within a 256 byte ring buffer. If the size of another ring buffer allocated to the processing device were 128 bytes, the corresponding processing device would then have to execute address software that recognizes a 128 location address space. Since a processing device may be allocated different sizes of ring buffers by different resources in a system, it has to 1) be cognizant of the size of the ring buffer allocated to it by the particular resource when it attempts to access its ring buffer for that resource and 2) when processing the ring buffer to a given resource, take into account the size of the ring buffer so as to execute address software that generates addresses to properly identify the locations within the physical address space occupied by the allocated ring buffer.

SUMMARY OF THE INVENTION

The present invention provides a method and apparatus for aliasing addresses generated by a processing device so that the processing device can address a memory block of variable size based upon an address space of fixed size. In this manner, the processing device need not be cognizant of the size of the memory block and can use a common address software that is consistent with the fixed size of the address space, irrespective of the size of the memory block being addressed.

The method and apparatus of the present invention can be advantageously implemented in a ring buffer interlock scheme to permit control, e.g. at initialization time, over the setting of the sizes of ring buffers allocated to the various processing devices utilizing a shared resource or resources. The size allocation is used, in effect, to throttle the flow of requests from the particular processing device by fixing the size so that the particular processing device runs out of locations that it owns at a number of outstanding requests that is fair relative to the number of outstanding requests from the other processing devices of the system. The utilization of the aliasing scheme of the present invention eliminates any need to communicate the allocated ring buffer sizes to the respective processing devices and the processing devices can operate to generate addresses for its allocated ring buffer or buffers with a common address software.

Generally, the present invention comprises an address aliasing device that couples an address generating unit, such as one of the processing devices, to a memory system. The memory system can comprise a ring buffer system, as, e.g., a RAM divided into a set of ring buffer sections. Each of the ring buffer sections is of a fixed size and, in the context of a ring buffer interlock scheme, is allocated for use by a particular processing device.

The address aliasing device receives as an input addresses for the ring buffer locations generated by the processing devices. The address aliasing device includes a register arrangement that stores ring buffer size information. The ring buffer size information is read by the address aliasing device and decoded to provide bit information representative of the size of a ring buffer corresponding to a particular address received by the address aliasing device from one of the processing devices.

The address aliasing device logically combines in a boolean operation the ring buffer size bit information with appropriate corresponding bits of the input address to provide an alias address that is consistent with the size allocated to the respective ring buffer. The ring buffer size bit information can be generated so that the logical combination with the input addresses results in a sequence of alias addresses that correspond to the full size of the ring buffer or to one of several preselected fractions of the full size of the ring buffer.

The ring buffer size information stored in the register arrangement can be generated under software control. A processor performing management functions in the computer system is programmed to fix ring buffer sizes as a function of the system configuration and the capabilities of both the processing devices and the resource. The management processor is programmed to write ring buffer size information into the register arrangement of the address aliasing device.

The address aliasing device of the present invention makes the actual allocated size of the memory block within the address space of the ring buffer irrelevant to the processing devices so that the processing devices need not be cognizant of the size of the memory block and can use a common address software that is consistent with the fixed size of the address space, irrespective of the size of the memory block being addressed.

BRIEF DESCRIPTION OF THE DRAWINGS

FIG. 4 illustrates a table summarizing information contained in the look-up table device of FIG. 2.

DETAILED DESCRIPTION

Figure 1:
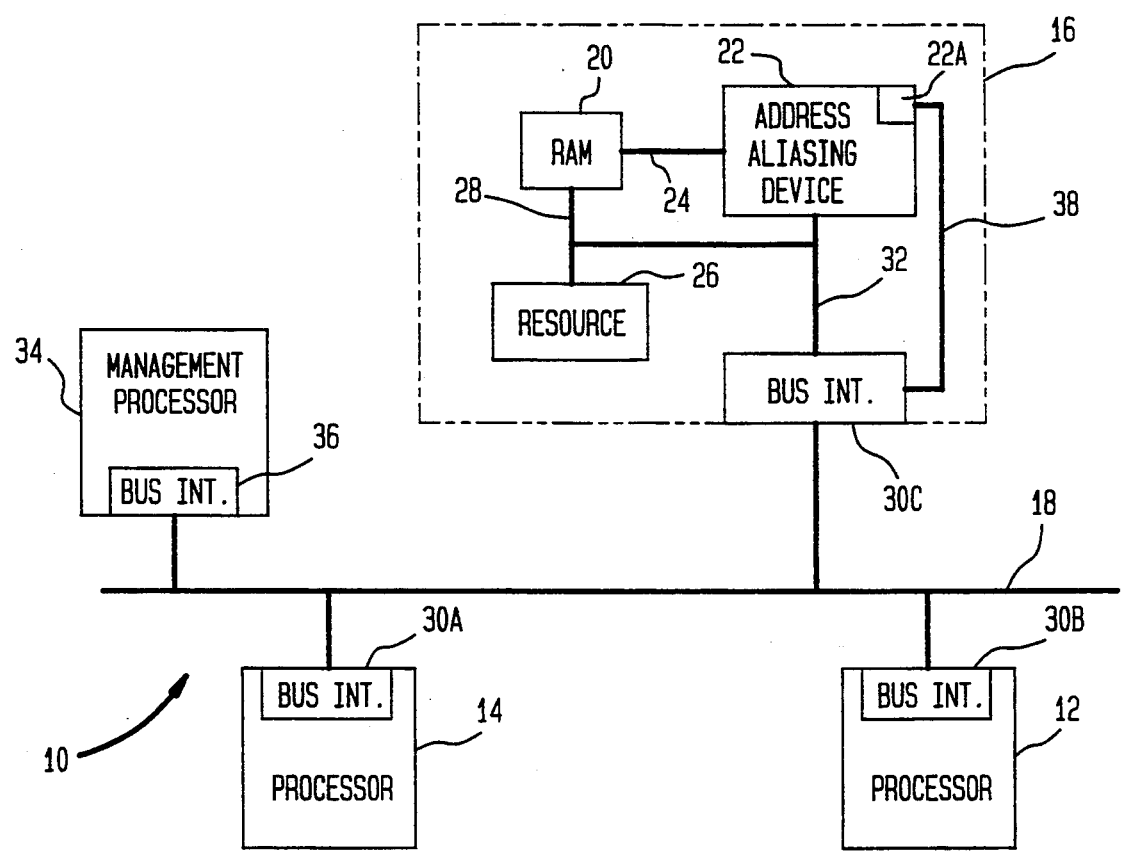
FIG. 1 is a block diagram of a computer system wherein a plurality of processors share a resource.

Referring now to the drawings, and initially to FIG. 1, there is illustrated a computer system generally indicated by the reference numeral 10. The computer system 10 comprises a plurality of processors 12, 14 and a resource module 16 coupled to one another by a backplane bus 18. The resource module 16 includes a RAM 20 and an address aliasing device 22 according to the present invention. A point-to-point coupling 24 is arranged to couple an output of the address aliasing device 22 to an address port of the RAM 20. The address aliasing device 22 further includes a register arrangement 22A containing RAM section size information, as will be described below. In addition, a resource 26 is coupled to address, data read and data write ports of the RAM 20 by a coupling 28. The resource 26 can comprise a processor whose function includes the performance of a preselected processing service for any of the processors 12, 14.

Each of the processors 12, 14 and the resource module 16 is provided with a backplane bus interface 30A, 30B, 30C, respectively, to control communication over the backplane bus 18. The backplane bus 18 and backplane bus interfaces 30A, 30B, 30C can be operated according to the Futurebus asynchronous backplane bus protocol standard promulgated by the IEEE (ANSE/IEEE Std. 896.1).

As illustrated schematically in FIG. 1, the bus interface 30C couples appropriate address lines from the bus 18 to an input of the address aliasing device 22 and appropriate data lines to the data read and data write ports of the RAM 20 via lines 32.

When a processor 12, 14 requires the resource 26 for performance of the processing service, it will arbitrate for control of the backplane bus 18 through the respective backplane bus interface 30A, 30B and, upon obtaining control of the backplane bus 18, transmit an address for a predetermined location in the RAM 20. The processor 12, 14 will first read the addressed location to verify ownership and then write a request for service and other relevant information into the location of the RAM 20 identified by the transmitted address when the processor 12, 14 owns the location. The resource 26 operates to poll the RAM 20 for requests to process via the coupling 28.

A management processor 34 is also coupled to the bus 18 by a bus interface 36. A coupling 38 couples the bus interface 30C to the register arrangement 22A of the resource module 16 so that the register arrangement 22A can be accessed via the bus 18, as for example, by the management processor 34 for writing of RAM section size information, as will be described.

According to the present invention, the address transmitted by the processor 12, 14 over the bus 18 is input to the address aliasing device 22. The output of the address aliasing device 22 comprises an alias of the input address which is input to the address port of the RAM 20 via the line 24, as will appear.

The RAM 20 is logically divided into a plurality of fixed size ring buffers which are each allocated to one of the processors 12, 14 for exclusive use in writing requests to the resource 26. In a representative embodiment of the present invention, the RAM 20 comprises a 4K RAM divided into sixteen ring buffers of 256 bytes each. The illustration of processors 12, 14 is representative only, as, for example, there can be a total of sixteen processors coupled to the bus 18 with each processor being allocated one of the sixteen 256 byte buffers as an interlock to the resource 26 and so on for different numbers of processors and ring buffers.

Figure 2:
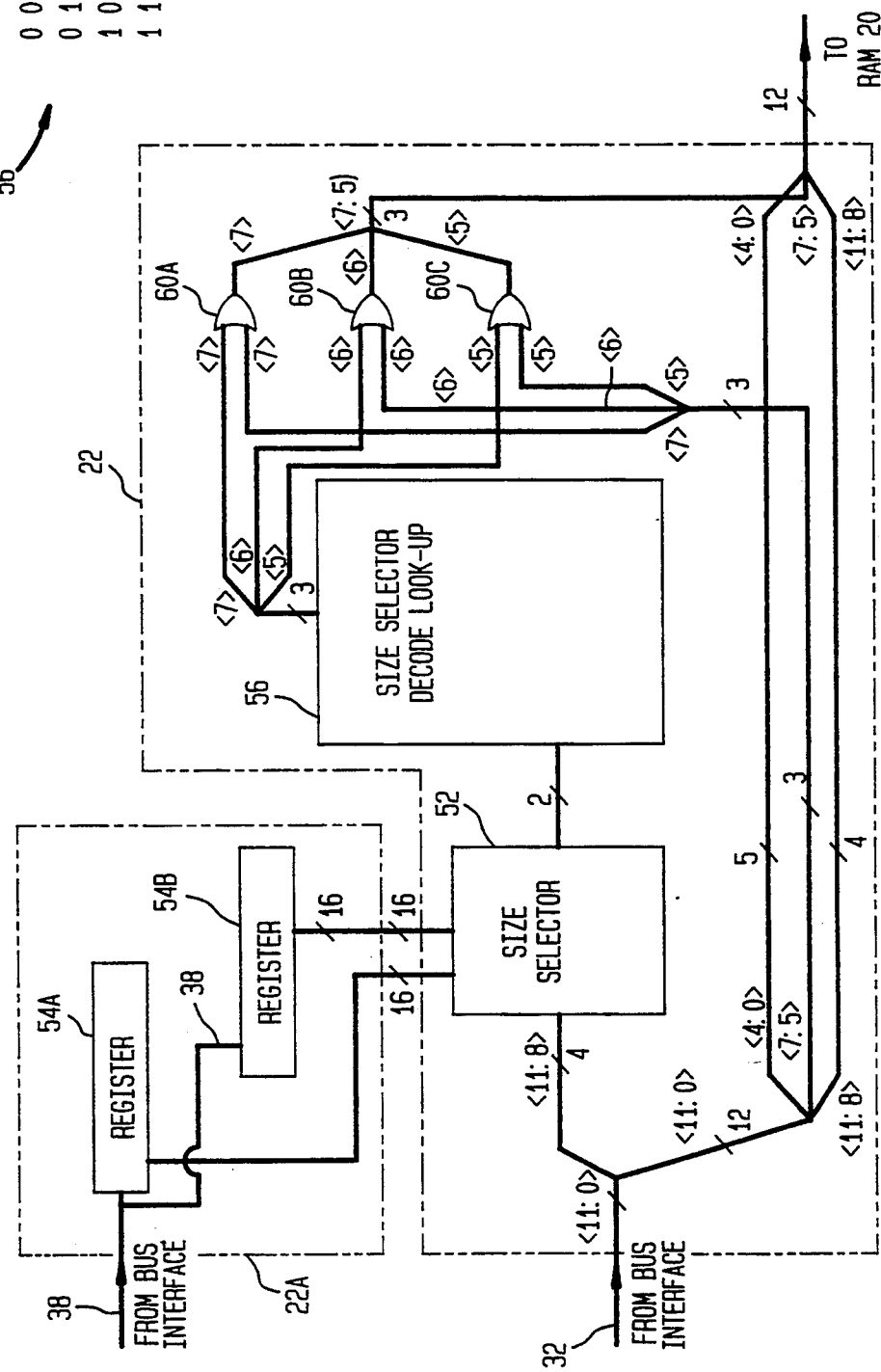
FIG. 2 is a block diagram of the address aliasing device of FIG. 1, according to the present invention.

Referring now to FIG. 2, there is illustrated in block diagram form, the address aliasing device 22 according to the present invention. In the 4K RAM example, a 12 bit address is needed to uniquely identify one of the total of 4,096 addressable locations available in the RAM 20. Accordingly, the lines 32 from the bus interface 30C that are coupled to the input of the address aliasing device 22 comprise 12 bits of the address transmitted over the bus 18. As should be understood, the address transmitted by the processor 12, 14 is determined by the address space defined by the bus protocol. For example, a 32 bit address is utilized in the Futurebus protocol. The 12 bits utilized to address the 4K RAM 20 can comprise the 12 low order bits of the 32 bit bus address. These 12 bits are used by each processor 12, 14 to address one location in an allocated 256 byte section of the RAM 20 within the 32 bit bus address space.

Figure 3:
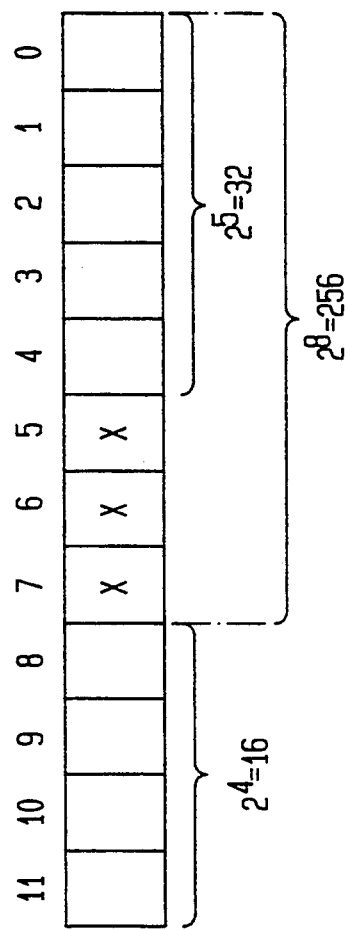
FIG. 3 illustrates an address input to the address aliasing device of FIG. 2.

In addition, the four high order bits <11:8> are input to a size selector device 52. Referring for a moment to FIG. 3, the bits <11:8> of the RAM address are used to select one of the 16 256-byte sections of the RAM 20 allocated as a ring buffer (four bits, $2^4=16$) and thus represent the ring number. As should be understood, the remaining bits <7:0> are used to identify one location within the 256 byte RAM section defined by bits <11:8> (eight bits, $2^8=256$) and thus represent an offset within a particular ring.

As illustrated in FIG. 2, the RAM section size register arrangement 22A comprises two 16 bit registers 54A and 54B for a total of 32 bits of storage space. Accordingly, 16 two bit sections of the 32 bits are each dedicated as a two bit size selector for a corresponding one of the 16 ring buffer sections of the RAM 20 defined by bits <11:8>. Thus, the 32 bits stored in the registers 54A, 54B provide a mask for setting the total number of addressable locations in each of the 16 sections of the RAM 20 that are to be used as a ring buffer by the respective processor 12, 14.

The size selector device 52 functions as a multiplexer receiving as an input all 32 bits stored in the registers 54A, 54B. The bits <11:8> input to the size selector device 52 are used as a multiplexer select control to select the one two-bit size selector of the 32 bits of the registers 54A, 54B that corresponds to the RAM section defined by bits <11:8>. The selected two bit size selector is output by the size selector device 52.

The two bit size selector output of the size selector device 52 is input as an index to a size selector decode look-up table 56. Referring now to FIG. 4, the look up table contains four locations, one for each possible value of the two bit size selector index input to the look-up table 56. Each location stores a three bit size code that is output by the look-up table 56.

The three bit codes correspond to bits <7>, <6> and <5> of the 12 bit input address and represent full, half, quarter and eighth sizes for the corresponding RAM section defined by bits <11:8>. More specifically, code 000 indicates that the full 256 bytes of the RAM section are available to store requests for the resource 26 by the respective processor 12, 14; code 100 indicates that half, or 128 bytes, of the RAM section are to be used for storing requests; code 110 indicates 64 bytes (one quarter of the section); and code 111 indicates 32 bytes (one eighth of the RAM section).

Referring again to FIG. 2, bits <4:0> will identify 32 unique locations within the RAM section indicated by bits <11:8>. Bit <5> identifies 64 unique locations, i.e. a logical 1 for bit <5> with each of the 32 possible values for bits <4:0> and a zero for bit <5> with each of the 32 possible values for bits <4:0>. In the same manner, bits <7:6> each double the total number of possible unique values for the lower order bits so that bit <6> defines two 64 location sections (lower order bits <5:0> total six bits, $2^6=64$) for a total of 128 locations and bit <7> defines two 128 location sections (lower order bits <6:0> total seven bits, $2^7=128$) for a total of 256 locations. Accordingly, control of each of bits <7:5> results in control of 256, 128, 64 and 32 location sections, respectively, of the RAM 20. Thus, a logical combination of the three bits output by the look-up table 56 with corresponding bits <5:7> of the 12 bit input address is utilized to alias the sequence of addresses output by the address aliasing device 22, as will now be described.

A set of OR gates 60A, 60B, 60C corresponds to bits <7:5> of the 12 bit input address. Each of the OR gates 60A, 60B, 60C takes as a first input a corresponding one of the bits of the three bit code output by the look-up table 56. Moreover, the OR gate 60A takes as a second input bit <7> of the 12 bit input address, the OR gate 60B takes as a second input bit <6> of the 12 bit input address and the OR gate 60C takes a second input bit <5> of the 12 bit input address. The 12 bit address output of the address aliasing device 22 comprises bits <4:0> of the 12 bit input address, the outputs of the OR gates 60A, 60B, 60C and bits <11:8> of the 12 bit input address.

When the three bit code is 000, the output of the OR gates 60A, 60B, 60C will be determined by the value of the bits <7:5> of the 12 bit input address. This is because the three bit code provides three zeros as inputs to the OR gates 60A, 60B, 60C and the value of each of the OR gate outputs will be a zero when the corresponding bit <7:5> from the 12 bit input address is zero and will be a logical 1 when the corresponding bit from the 12 bit input address is a logical 1. Thus, the processor 12, 14 will control the values for bits <7:5> and be able to specify one of 256 locations for full use of the respective RAM section defined by bits <11:8> of the address.

When the three bit code is 100, the input to the OR gate 60A from the output of the look-up table 56 will be a logical 1 and, therefore, the output of the OR gate 60A will remain a logical 1 regardless of the value of bit <7> in the 12 bit input address. Thus, the address output by the address aliasing device 22 will be within a range of 128 locations. The processor 12, 14 will continue to generate 12 bit addresses within a 256 byte address space, but when an address contains a zero in bit <7> an alias address having bit <7> set at logical 1 will be output by the address aliasing device 22 via the logical 1 output of the OR gate 60A. Accordingly, the size of the allocated ring buffer will be half of the 256 locations in the RAM section defined by bits <11:8>. When the processor 12, 14 generates an address for a 129th request (assuming none of the previous requests have been serviced), the address aliasing device 22 will input an alias address corresponding to the location of the first request. The ownership will still be with the resource 26 and the processor 12, 14 must wait before it writes any additional requests into the respective allocated ring buffer section within the RAM 20.

Code values of 110 and 111 will achieve similar address aliasing effects for buffer sizes of 64 and 32 bytes, respectively. Code value 110 causes the output of the OR gates 60A, 60B to remain at logical 1 and code value 111 causes the output of all of the OR gates 60A, 60B, 60C to remain at logical 1 regardless of the values for bits <7:6> or <7:5>, respectively, generated by the processor 12, 14. As should be understood, the processors 12, 14 continue to generate addresses on the basis of a 256 location address space and the address aliasing device 22 aliases the generated addresses so that the size of the respective ring buffer is fixed at a number of locations that is fair relative to other processors 12, 14.

Referring again to FIG. 1, at system initialization time the management processor 34 generates, as a function of system configuration, the values for the 32 bits of the code representing the size of each of the ring buffer sections of the RAM 20 which is to be used for the current configuration. The management processor 34 writes the 32 bit code into the register arrangement 22A via the bus 18 and coupling 38. The code value represented by the 32 bits stored in the register arrangement 22A can be updated as desired when new processors are added to the system, provided that the sizes of the buffers not currently in use are the only ones changed.

What is claimed is:

1. An address aliasing device, which comprises:
   a size selector for generating memory size aliasing bits;
   an address input adapted to receive a multiple bit address for a memory system;
   a logic device coupled to each of the address input and the size selector for logically combining preselected ones of the multiple bits of the address and the memory size aliasing bits to provide an alias for the preselected ones of the multiple bits; and
   an output lead for providing an output comprising the alias for said preselected ones of the multiple bits as well as bits of the multiple bit address other than those preselected ones of the multiple bits.

2. A method for aliasing an address, comprising the steps of:
   providing a set of memory size aliasing bits;
   providing a multiple bit address;
   logically combining preselected ones of the multiple bits of the memory address and the memory size aliasing bits to provide an alias for the preselected ones of the multiple bits; and
   concatenating the alias for the preselected ones of the multiple bits and bits of the multiple bit address other than the preselected ones of the multiple bits.

3. An address aliasing device, which comprises:
   a memory size code storage device for storing a code indicative of a number of locations in a memory system that are available for use;
   a size selector coupled to the memory size code storage device to read and decode the code into corresponding memory size aliasing bits;
   an address input adapted to receive a multiple bit address for the memory system;
   a logic device coupled to each of the address input and the size selector for logically combining preselected ones of the multiple bits of the address and the memory size aliasing bits to provide an alias for the preselected ones of the multiple bits; and
   an output lead for providing an output comprising the alias for the preselected ones of the multiple bits and bits of the multiple bit address other than the preselected ones of the multiple bits.

4. The address aliasing device of claim 3 wherein the logic device comprises a set of OR gates; each of the OR gates including a first input for input of one of the memory size aliasing bits and a second input for input of a corresponding one of the preselected ones of the multiple bit memory address and each of the OR gates including an output lead; the output leads of the OR gates provide an output comprising the aliases for the preselected ones of the bits of the multiple bit address.

5. An address aliasing device, which comprises:
   a memory size code storage device storing a code indicative of a number of locations available for use in each of a plurality of memory storage spaces;
   a size selector coupled to the memory size code storage device;
   an address input adapted to receive a multiple bit address for one of the plurality of memory storage spaces;
   the size selector arranged to read and decode the code stored in the memory size code storage device to determine the number of locations available for use in one of the plurality of memory storage spaces as a function of the address received by the address input and to generate memory size aliasing bits as a function of the number of available locations in the one of the plurality of memory storage spaces;
   a logic device coupled to each of the address input and the size selector for logically combining preselected ones of the multiple bits of the multiple bit address and the memory size aliasing bits to provide an alias for the preselected ones of the multiple bits; and
   an output lead for providing an output comprising the alias for the preselected ones of the multiple bits and bits of the multiple bit address other than the preselected ones of the multiple bits.

6. An address aliasing device, which comprises:
   a memory size code storage device which stores a code indicative of a number of locations in a memory system that are available for use in each of a plurality of memory storage spaces arranged in the memory system;
   a size selector coupled to the memory size code storage device to read and decode the code into corresponding memory size aliasing bits, wherein the size selector operates to determine the memory size aliasing bits of one of the plurality of memory storage spaces as a function of the code and the address received by an address input, said address input adapted to receive a multiple bit address for the memory system;
   a logic device coupled to each of the address input and the size selector for logically combining preselected ones of the multiple bits of the address and the memory size aliasing bits to provide an alias for the preselected ones of the multiple bits, wherein the logic device comprises a set of OR gates; each of the OR gates including a first input for input of one of the memory size aliasing bits and second input for input of a corresponding one of the preselected ones of the multiple bit memory address and each of the OR gates including an output; the outputs of the OR gates comprising the aliases for the preselected ones of the bits of the multiple bit address; and
   an output comprising the alias for the preselected ones of the multiple bits and bits of the multiple bit address other than the preselected ones of the multiple bits.

7. The address aliasing device of claim 6, wherein the memory size code storage device stores a multiple bit code divided into n bit sections, each n bit section being indicative of the number of locations available for use in a corresponding one of the plurality of memory storage spaces.

8. The address aliasing device of claim 7, wherein the size selector determines one of the n bit sections of the code as a function of the address received by the address input and the size selector further includes a size selector decoder to decode the n bit section of the code determined by the size selector into the memory size aliasing bits.

9. The address aliasing device of claim 8, wherein the size selector decoder comprises a look-up table having $2^n$ locations, each location storing memory size aliasing bits for a corresponding one of the n bit sections of the code and the one n bit section determined by the size selector being used as an index to the look-up table.

10. An address aliasing device, which comprises:
- a size selector for generating memory size aliasing bits including a storage device for storing a code indicative of a number of locations in the memory system that are available to a user and wherein the size selector decodes the code into the memory size aliasing bits;
- an address input adapted to receive a multiple bit address for a memory system;
- a logic device coupled to each of the address input and the size selector for logically combining preselected ones of the multiple bits of the address and the memory size aliasing bits to provide an alias for the preselected ones of the multiple bits; and
- an output lead for providing an output comprising the alias for the preselected ones of the multiple bits and bits of the multiple bit address other than the preselected ones of the multiple bits.

11. The address aliasing device of claim 10, wherein the size selector comprises a look-up table for input of the code and output of corresponding memory size aliasing bits.

12. A computer system, which comprises:
- a plurality of processors;
- a memory device including read and write data ports and an address port;
- a bus for coupling the processors to one another and to the read and write data ports of the memory device;
- a size selector for generating memory size aliasing bits;
- an address input adapted to receive a multiple bit address from the memory device;
- a logic device coupled to each of the address input and the size selector for logically combining preselected ones of the multiple bits of the address and the memory size aliasing bits to provide an alias for the preselected ones of the multiple bits; and
- an output lead for providing an output comprising the alias for said preselected ones of the multiple bits as well as bits of the multiple bit address other than those preselected ones of the multiple bits;
- the output lead being coupled to the address port of the memory device.

13. A computer system, which comprises:
- a plurality of processors;
- a memory system including a plurality of memory storage spaces, read and write data ports and an address port;
- a bus for coupling the processors to one another and to the read and write data ports of the memory system;
- a memory size code storage device for storing a code indicative of a number of locations available for use in each of a plurality of memory storage spaces of the memory system;
- an address input coupled to the bus and adapted to receive multiple bit addresses from the processors via the bus, each one of the multiple bit addresses identifying a location in one of the plurality of memory storage spaces;
- a size selector coupled to the memory size code storage device;
- the size selector arranged to read and decode the code stored in the memory size code storage device to determine the number of locations available for use in one of the plurality of memory storage spaces as a function of an address received by the address input from one of the processors via the bus and to generate memory size aliasing bits as a function of the number of available locations in the one of the plurality of memory storage spaces;
- a logic device coupled to each of the address input and the size selector for logically combining preselected ones of the multiple bits of the multiple bit address received from the one of the processors and the memory size aliasing bits to provide an alias for the preselected ones of the multiple bits; and
- an output lead for providing an output comprising the alias for the preselected ones of the multiple bits and bits of the multiple bit address other than the preselected ones of the multiple bits;
- the output lead being coupled to the address port of the memory system.

14. The computer system of claim 13, wherein the memory size code storage device is coupled to the bus for input of said code indicative of a number of locations available for use in each of said plurality of memory storage spaces of the memory system by one of said processors via the bus.

15. A computer system, which comprises:
- a plurality of processors;
- a memory device including read and write data ports and an address port;
- a bus for coupling the processors to one another and to the read and write data ports of the memory device;
- a memory size code storage device for storing a code indicative of a number of locations available for use in the memory device;
- an address input coupled to the bus and adapted to receive multiple bit addresses from the processors via the bus, each one of the multiple bit addresses identifying a location in the memory device;
- a size selector coupled to the memory size code storage device;
- the size selector arranged to read and decode the code into corresponding memory size aliasing bits;
- a logic device coupled to each of the address input and the size selector for logically combining preselected ones of the multiple bits of the multiple bit address received from the one of the processors and the memory size aliasing bits to provide an alias for the preselected ones of the multiple bits; and
- an output lead for providing an output comprising the alias for the preselected ones of the multiple bits and bits of the multiple bit address other than the preselected ones of the multiple bits;
- the output lead being coupled to the address port of the memory system.

16. The computer system of claim 15, wherein the memory size code storage device is coupled to the bus for input of said code indicative of the number of locations available for use in the memory device by one of said processors via the bus.

17. The computer system of any one of claims 13, 15 or 12, wherein the logic device comprises a set of OR gates; each of the OR gates including a first input for input of one of the memory size aliasing bits and a second input for input of a corresponding one of the preselected ones of the multiple bits of the multiple bit address and each of the OR gates including an output; the outputs of the OR gates comprising the alias for preselected ones of the multiple bits of the multiple bit address.

* * * * *